United States Patent

[11] 3,603,514

| [72] | Inventor | Robert M. Williams |
| --- | --- | --- |
| | | Ladue, Mo. |
| [21] | Appl. No. | 845,346 |
| [22] | Filed | July 28, 1969 |
| [45] | Patented | Sept. 7, 1971 |
| [73] | Assignee | Williams Patent Crusher & Pulverizer Co., Inc. |
| | | St. Louis, Mo. |

[54] SCRAP REDUCING AND REFINING APPARATUS
8 Claims, 11 Drawing Figs.

[52] U.S. Cl. .................................................... 241/31,
241/48, 241/79.1
[51] Int. Cl. ....................................................... B02c 13/04,
B02c 21/00
[50] Field of Search ........................................... 241/31, 48,
49, 79, 79.1, 79.2, 80, 186, 189, 189 A, 24, 86

[56] References Cited
UNITED STATES PATENTS
1,708,123   4/1929   Day ............................. 241/16

| 2,069,568 | 2/1937 | Wieder ........................ | 23/224 |
| 2,486,421 | 11/1949 | Kessler ........................ | 241/86 |
| 2,942,792 | 6/1960 | Anderson ..................... | 241/24 X |
| 2,990,124 | 6/1961 | Cavanagh ..................... | 241/24 |
| 3,083,921 | 4/1963 | Danyluke ..................... | 241/186 |

Primary Examiner—Donald G. Kelly
Attorney—Gravely, Lieder & Woodruff

ABSTRACT: Apparatus for reducing scrap material, such as automobile bodies and waste objects of a bulky and space consuming character, in a unified plant that is operable on a continuous schedule to reduce the scrap to convenient sizes in advance of processing the same through a shredding mill and thence to apparatus for densifying the output of the shredding mill, and for recycling oversize portions of the product for further shredding treatment so that substantially all of the usable scrap may be recovered and separated from those portions that are not usable.

FIG.1

INVENTOR
ROBERT M. WILLIAMS
BY Gravely Lieder & Woodruff
ATTORNEYS.

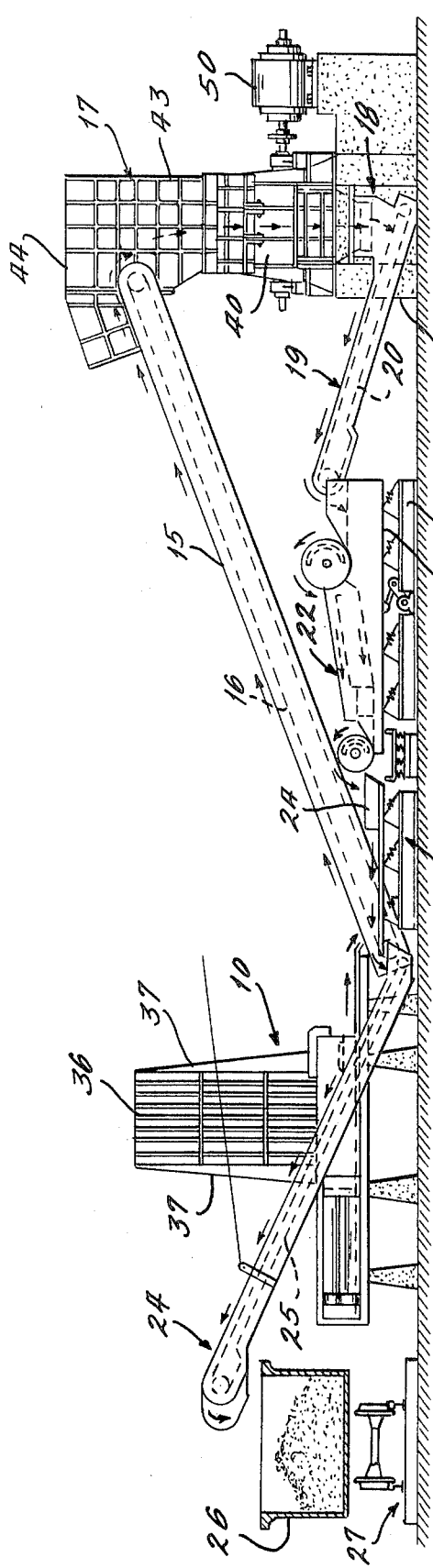
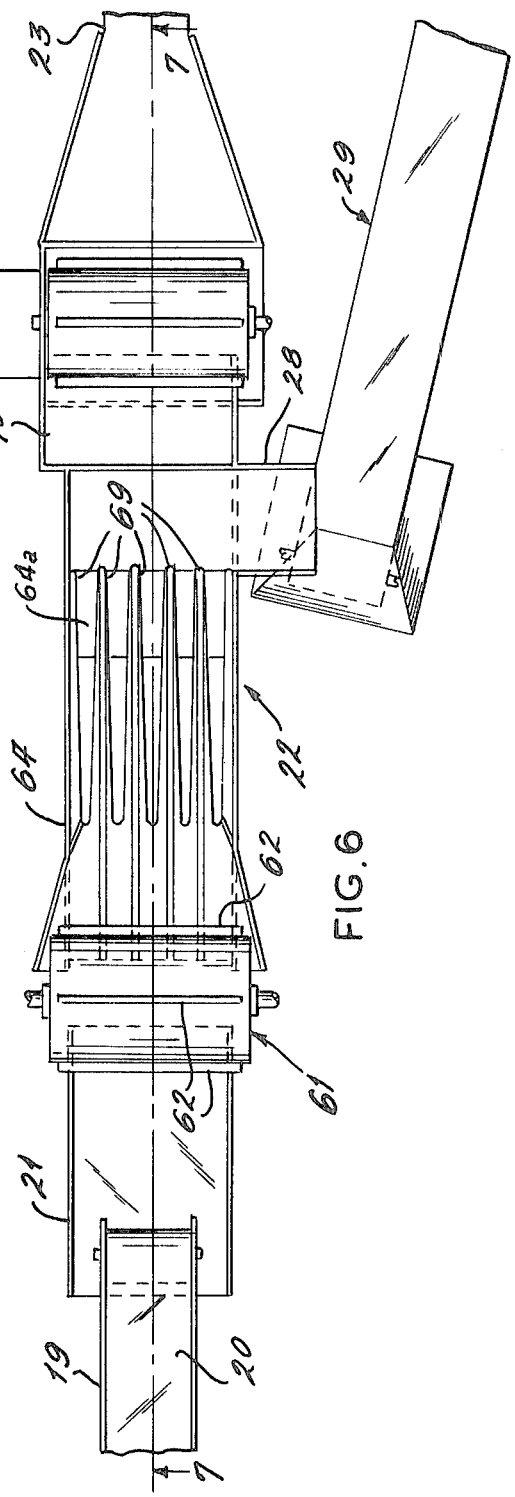

INVENTOR
ROBERT M. WILLIAMS
BY Gravely Lieder & Woodruff
ATTORNEYS

INVENTOR:
ROBERT M. WILLIAMS
BY Gravely, Lieder & Woodruff
ATTORNEYS.

INVENTOR:
ROBERT M. WILLIAMS
BY Travely Lieder & Woodruff
ATTORNEYS.

SCRAP REDUCING AND REFINING APPARATUS

BRIEF DESCRIPTION OF THE INVENTION

This invention relates to an improved apparatus for reducing and refining bulky scrap and waste material and objects that rapidly accumulate, but for this invention are easily disposed of with consequent recovery of valuable components in such size and condition of refinement as to aid the conservation of resources of the country.

In the following specification reference will be made to the reduction and refinement of automobile bodies, but no limitation is to be implied from this.

The conservation of natural resources and a lessening of the ever increasing number and size of graveyards for discarded objects of almost every kind and description can prove to be a source of valuable and reusable scrap metal. Automobile bodies are usually high quality metal which can be mixed with virgin metal to produce a source of metal or alloys for fabricating new products. The problems heretofore encountered are the expense of land acquisition away from habitable areas, the pollution of the atmosphere, noise and dirt which usually attends recovery operations and the constant maintenance required of the older types of scrap recovery apparatus.

The present apparatus includes structure for bringing the scrap and waste objects to the processing plant at a point where the objects are presized or cut into manageable sizes for transfer to a shredding mill, shredding the presized objects to reduce the size still further, conducting the reduced objects to a densifying step where the ferrous and nonferrous components are magnetically and vibrationally separated, collecting the finished product and recycling the components that require further shredding. The apparatus also contemplates processing the objects in an inert gas atmosphere so that dust explosions and fire can be controlled and substantially avoided for the safety of the plant and the operating personnel. In connection with the creation of an inert gas atmosphere the present apparatus is capable of incinerating a substantial quantity of waste material to produce the inert atmosphere and avoid polluting the surroundings. The burning of the nonmagnetic fines and other combustible waste reduces the amount of residue yielded by this process.

It is, therefore, an important object of this invention to provide apparatus by which waste objects can be economically and safely reduced in a series of coordinated steps, whereby such waste objects are progressively reduced in size and separated from unwanted components, some materials are consumed by incineration, and a high quality of final product can be recovered.

Other objects of this invention are to overcome the undesired procedures practiced by older apparatuses to reduce atmospheric pollution, to reduce the expense of operation of processing plants, and to improve the quality of the final product.

BRIEF DESCRIPTION OF THE DRAWINGS

Presently preferred organizations of plant equipment and components are disclosed in the accompanying drawings, wherein:

FIG. 2 is a longitudinal side elevational view of the plant of FIG. 2;

FIG. 6 is an enlarged and fragmentary view of the densifier apparatus shown in the plan view of FIG. 1;

DESCRIPTION OF THE PREFERRED APPARATUS

Figure 1:
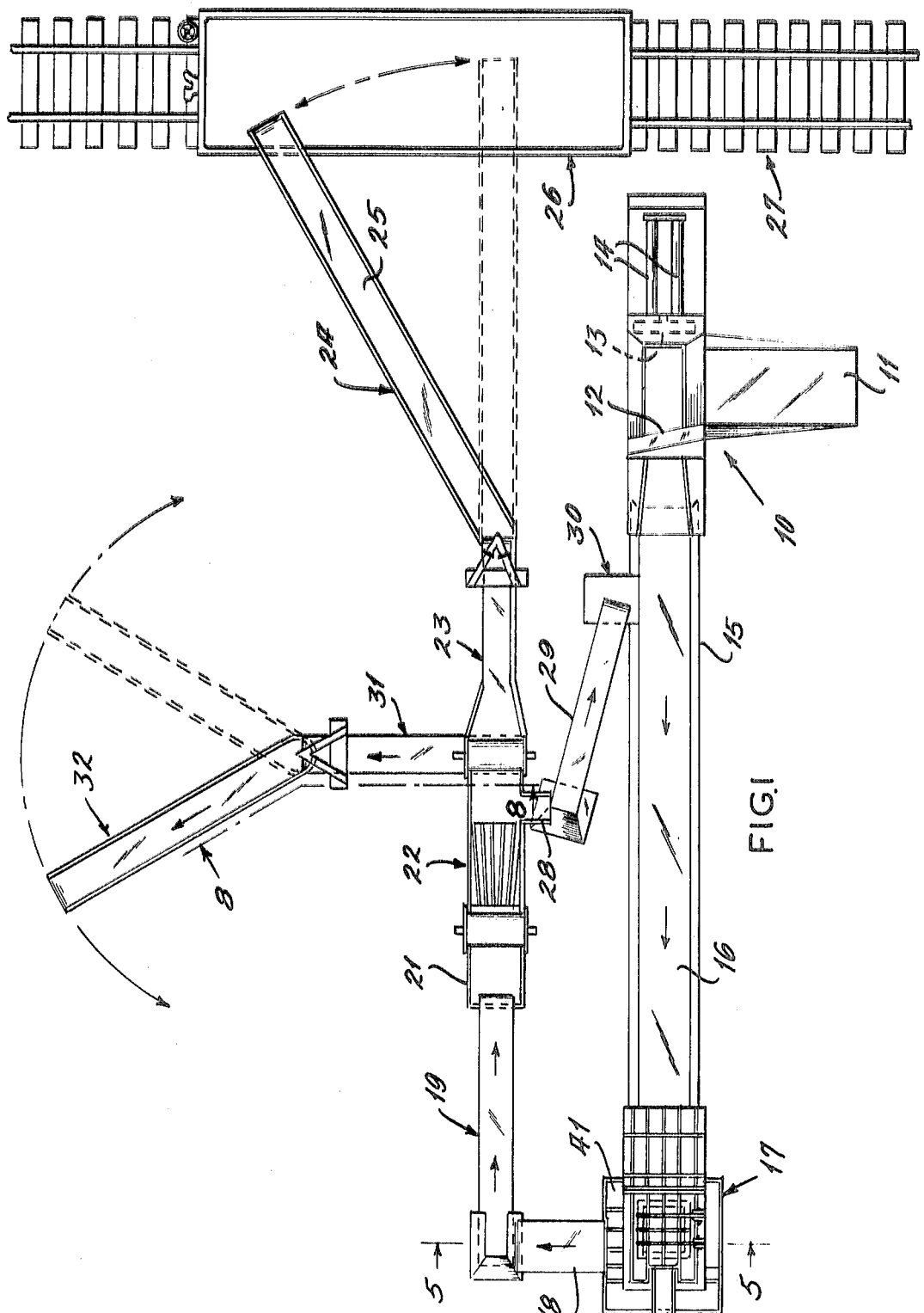
FIG. 1 is a schematic plan view of the equipment and components of apparatus by which the scrap reducing and refining may be carried out.
Figure 4:
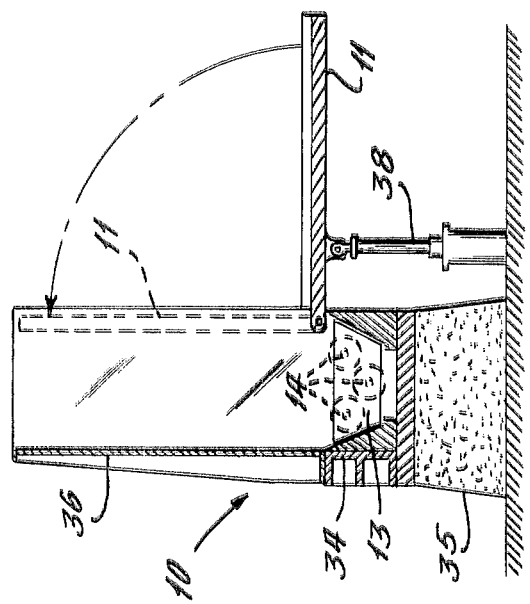
FIG. 4 is a fragmentary sectional elevational view of the presizer taken at line 4—4 in FIG. 3.

In the plant organization seen in FIGS. 1 and 2, the apparatus hereof may be employed to handle whole automobile bodies, frames, axles and springs. The engines and transmissions are first removed to prevent contaminating the end product. The plant is capable of operating at a rate of up to 100 tons per hour of scrap with a final product output density of up to about 80 pounds per cubic foot.

The plant comprises a presizer unit 10 having a receiving chute 11 which directs the scrap into position in front of a stationary shearing blade 12. A ram 13 is operated by a plurality of hydraulic pistons 14. The ram 13 pushes the scrap past the blade 12 and the severed parts emerge onto a conveyor 15 having a moving belt 16 inclined upwardly (FIG. 2) to transport the presized scrap to the top of the reducer or shredder unit 17. The discharge from shredder 17 is transported by conveyor 18 to the lower end of an inclined conveyor 19. The belt 20 in conveyor 19 delivers the shredded scrap to the inlet chute 21 of a densifier unit 22. From the densifier 22 the final product is again magnetically separated and is then conveyed by a vibrator conveyor 23 to the lower end of a swing conveyor 24 having a belt 25 which transports the product to a suitable elevation where it may be deposited in a gondola car 26 stationed on a railroad siding 27.

Mixed in with the final product moved through the densifier 22 is dirt, trash, nonferrous objects and oversized product. The densifier 22 is capable, as will presently appear, of separating the flow of such objects such that the oversized product is directed by a chute 28 onto a return conveyor 29 which delivers the same to a feeder station 30 where it is recycled onto conveyor belt 16 to again pass through the shredder for further reduction. The trash and nonferrous objects are collected on a vibratory conveyor and pass along a picking station 31 to the lower end of a second swing conveyor 32 which carries the same to the top of a trash pile.

Figure 3:
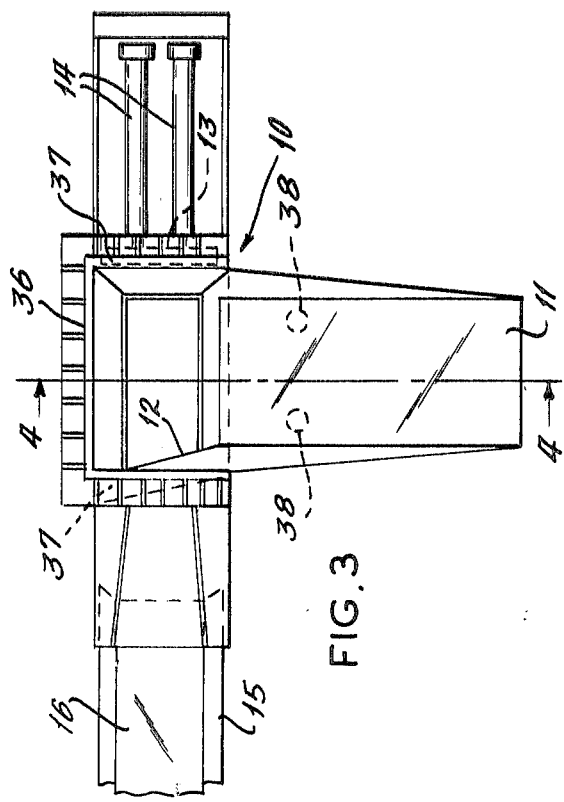
FIG. 3 is an enlarged fragmentary view of the presizer component of the plant layout.
Figure 7:
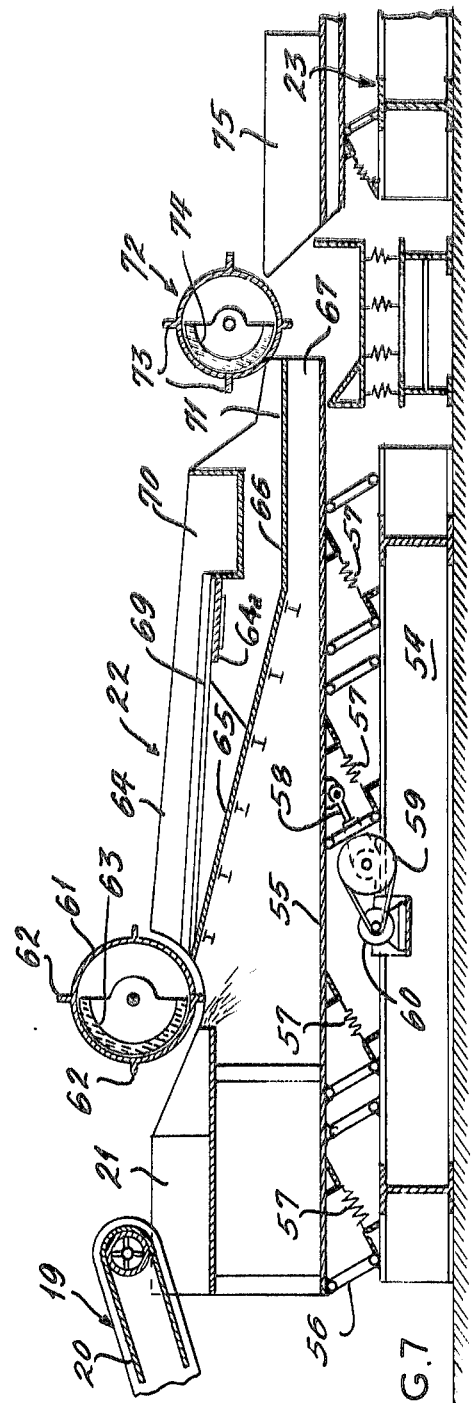
FIG. 7 is a longitudinal sectional elevational view of the densifier taken at line 7—7 in FIG. 6.
Figure 8:
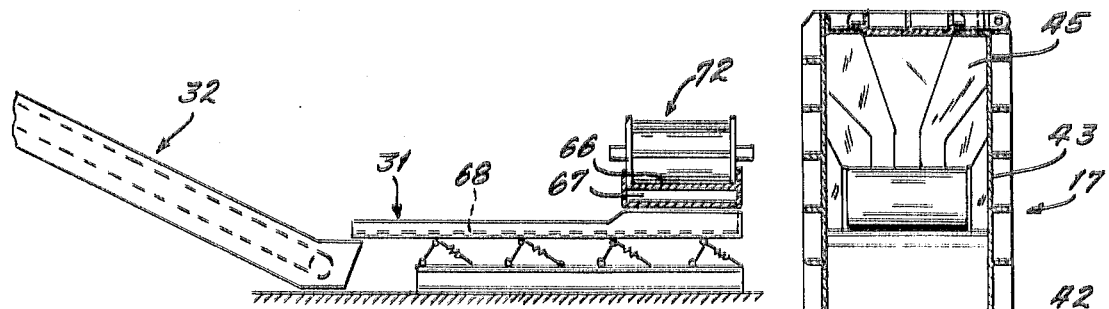
FIG. 8 is a fragmentary and partial sectional view of the densifier discharge as seen at line 8—8 in FIG. 1.

The presizer 10 is seen in FIGS. 1, 2, 3 and 4 and comprises a rigid frame 34 mounted on a suitable base 35. The frame 34 supports a vertical backup wall 36 and opposite sidewalls 37 (FIGS. 2 and 3). The chute 11 is pivoted in frame 34 and is raised and lowered by a pair of piston motors 38. The scrap is dumped by the chute 11 into the frame 34 in front of the ram 13 from which position it is rammed toward the blade 12, before noted.

Figure 5:
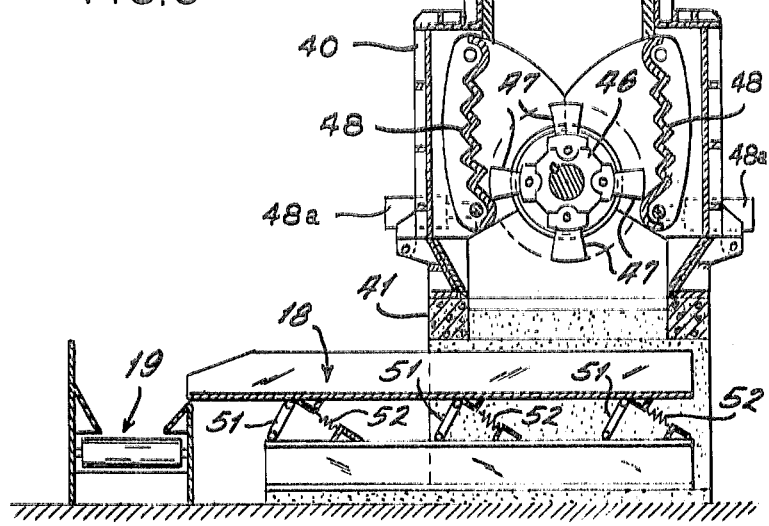
FIG. 5 is a fragmentary and greatly enlarged sectional elevational view of the shredding apparatus depicted in FIG. 2.

The shredder unit 17 (FIGS. 1, 2 and 5) includes a hammer mill housing 40 mounted to a substantial base 41. The inlet 42 to the housing 40 supports a drop chute 43 having a top hood 44 which encloses the upper end portion of the conveyor 15 and supports a dust suppressing curtain 45 which is flexible to pass the presized objects brought thereto. The presized objects fall into the rotor 46 equipped with pivoted hammers 47 which intercept the objects and, in cooperation with the breaker plates 48 which are yieldably held by hydraulic or pneumatic means 48A, break and shred the objects until they are reduced to a size capable of falling past the rotor onto the plate 49 of a vibratory conveyor 18. Grate bars are omitted but may be employed if desired in accordance with the disclosure in my prior U.S. application for Pat. Ser. No. 761,909, filed on Sept. 24, 1968. The rotor is driven in reversible directions by motor means 50 so that the hammers 47 do not have to be replaced as frequently as on a unidirectional rotor 46. The vibratory conveyor 18 is of a known character and is only schematically depicted with levers 51 and spring means 52 arranged to move the mill product leftwardly (FIG. 5) onto the receiving end of the inclined conveyor 19. This conveyor 19 delivers the shredded product to the inlet end of the densifier unit 22.

The densifier unit 22 (FIGS. 1, 2, 6 and 7) includes an elongated base 54 which supports a vibratory conveyor comprising a platform 55 supported by means of a series of levers 56 and springs 57. The platform 55 is connected by a link 58 to an eccentric unit 59 driven by motor means 60. The platform supports the chute 21 which directs the objects toward and under a magnetic rotor 61 having suitable cleats 62 spaced about its peripheral surface. The rotor houses a magnet 63 which picks up the ferrous and magnetic components and lifts the same up and over the rotor beyond the magnet so the objects thus separated fall onto a sizing deck 64. The nonmagnetic objects pass under the rotor 61 and fall upon the vibrating platform 55 and pass under the bottom wall 65 and 66 toward the discharge end 67 where this material falls onto the platform 68 of the vibrating conveyor 31.

The magnetic material with some trash carried with it falls onto the sizing deck 64 which is provided with a plurality of tines 69 of tapered and elongated form. The tapered spaces between the tines 69 pass objects of a desired size, but oversize objects and material will be held back by a control board 64A (FIG. 7) so that the desired material passing through the tapered spaces between the times 69 can vibrate over the chute 28 (FIG. 6) to the conveyor 29. The control deck board 64A is removable and may be varied in length to adjust the density or weight per cubic foot of the desired product.

The desired product passed by the tines 69 falls onto the sloped wall 65 and is vibrated over the wall 66 to the end portion 71 where it comes into the influence of a second magnetic rotor 72 having cleats 73 spaced about its periphery. A magnet 74 inside the rotor 72 attracts the magnetic components and carries the same up and deposits it in the end chute 74 of the vibratory conveyor 23. The vibratory conveyor 23, as are the conveyors 18 and 31, is similar to the vibratory conveyor mounted on the base 54 and the details need not be further described. The nonmagnetic trash and other objects pass under the second rotor 72 and fall onto the platform 68 of the vibratory conveyor 31.

The drive means for the magnetic separating rotors 61 and 72 is of conventional character and therefore the same has not been shown.

Conveyor 31 provides a station where an operator may hand pick out any objects of desired material such as aluminum and place the same in tote boxes or barrels thereby recovering valuable nonmagnetic metals. Likewise the conveyor 23 provides a station for an operator to inspect the makeup of the final product and extract material, such as copper entrained with steel particles, that is not desired. These two stations are conveniently adjacent so the interchange of material may be performed readily.

DESCRIPTION OF MODIFICATIONS

Figure 9:
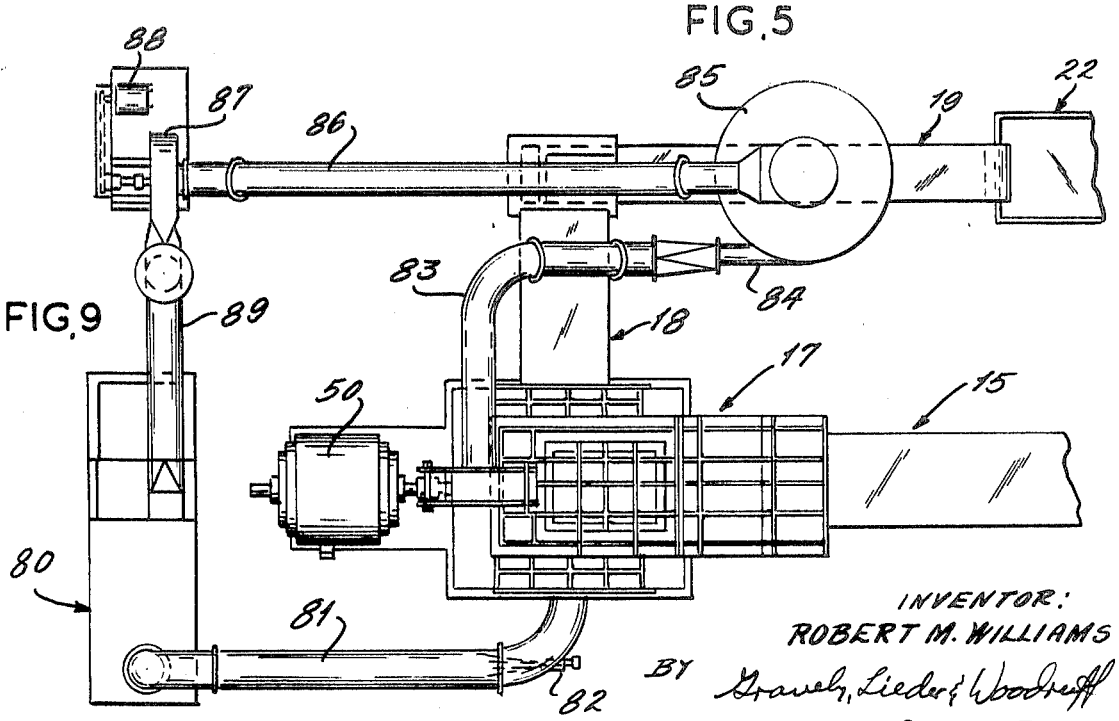
FIG. 9 is a fragmentary plan view of a processing plant showing a modification which may be incorporated in the apparatus of FIG. 1.

The plant layout seen in FIG. 1 may be modified to include an inert gas system of the character shown in FIG. 9. In the modified system a gas generator furnace 80A is operated in a manner that it supplies low oxygen content gas through duct 81 to the shredder housing past a water spray injector device 82. The moist gas maintains the shredder at an oxygen level below the point at which explosions might be encountered, and it picks up dust from the shredder 17 and conducts it through duct 83 to the inlet 84 of a cyclone collector unit 85. The flow from the collector 85 is by way of duct 86 to the fan 87 driven by motor means 88, and from the fan 87 the gas is delivered by duct 89 to the generator 80A. The inert gas from the generator to duct 81 reaches a temperature of approximately 900° F., and the injector device 82 creates a water mist curtain prior to delivery of the gas to the shredder so the explosion hazards are minimized and the gas temperatures substantially reduced. The modified arrangement, including the furnace operation, is better disclosed in my prior U.S. Pat. application Ser. No. 686,074 filed Nov. 11, 1967.

Figure 10:
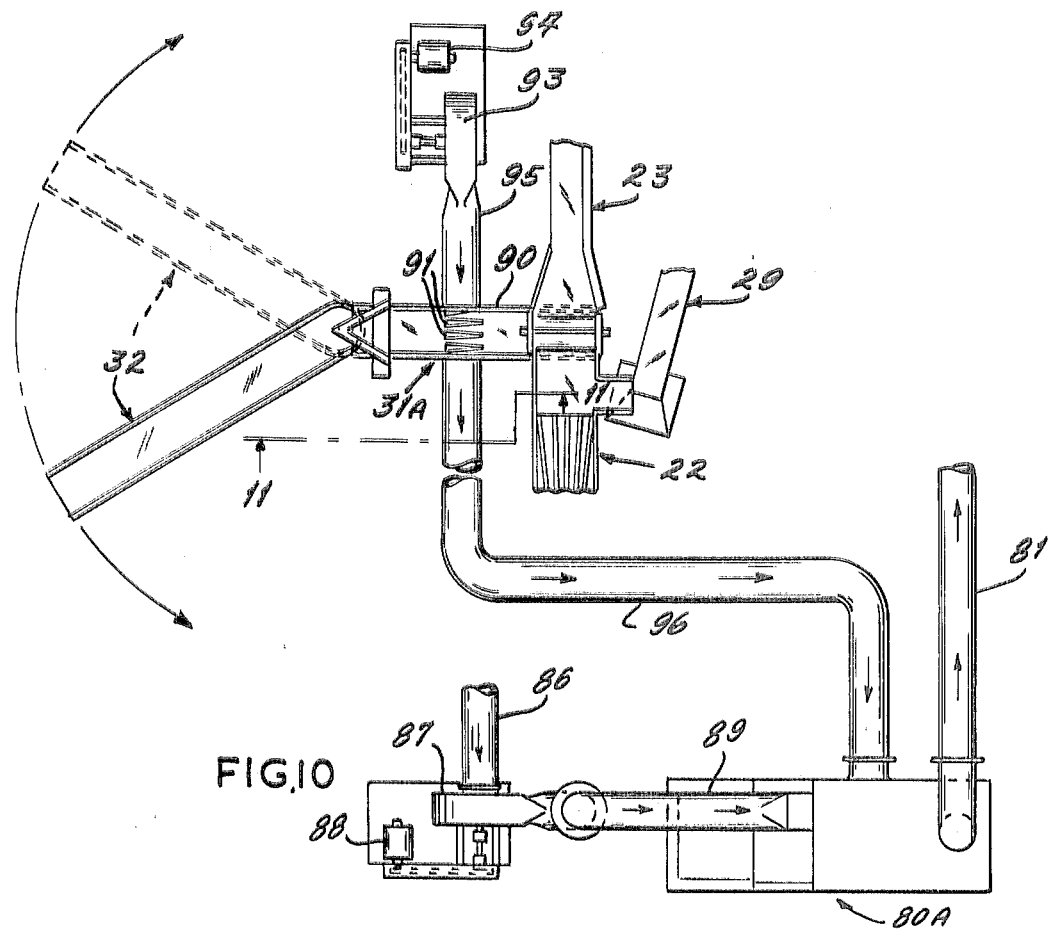
FIG. 10 is a fragmentary plan view of a processing plant modified to incorporate incineration provisions, whereby waste material can be substantially reduced.
Figure 11:
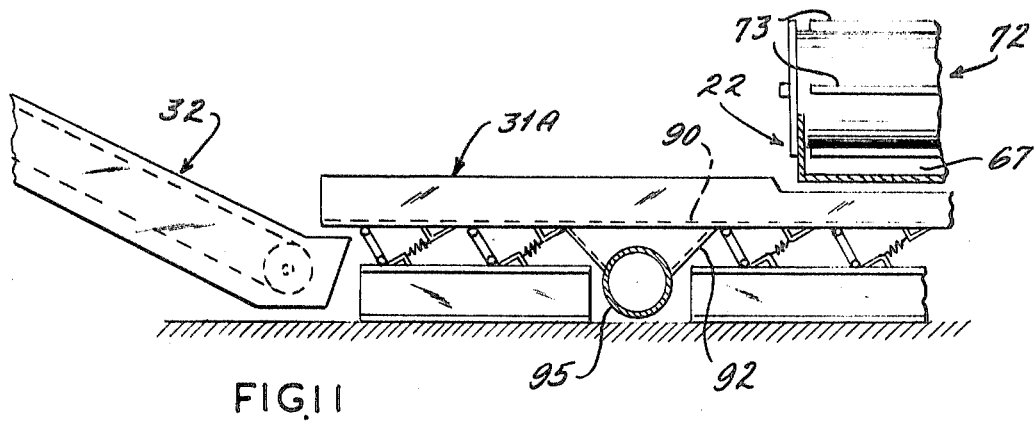
FIG. 11 is a fragmentary elevational view taken at line 11—11 in FIG. 10.

Use of the apparatus of the foregoing character includes reduction of as much of the waste material as is possible. A substantial portion of waste material is incinerated so that less waste is left to be disposed of by landfill methods. In the present invention when operating with an inert gas atmosphere, a percentage of the heat needed can be extracted from combustible "fines" which have been separated from large waste objects that cannot be easily handled. Such a system is seen in FIGS. 10 and 11 wherein the conveyor 31 of FIG. 1 is modified at 31A to include a sifter surface 90 having elongated tapered openings 91 through which the finer particles of the waste material may drop into a receiver 92 (FIG. 11) interposed in a positive blower system which will transport the same into the furnace 80A.

The blower system includes a blower 93 driven by motor means 94 and delivering air into conduit 95. The receiver 92 is interposed in conduit 95 so the waste fines can be carried in conduit 96 to the combustion area of furnace 80A. The addition of waste fines cuts down on the amount of gas or duel which needs to be supplied to the furnace 80A, and it also disposed of the waste in a closed system.

RESUME OF THE PROCESS

From the foregoing description the apparatus, and modifications, it can be appreciated that the scrap to be reduced is first presized at unit 10 to obtain manageable sizes of objects for processing in the shredder unit 17. The shredder unit 17 is reversible so that the hammer rotor 46 may be run clockwise or counterclockwise to increase the life of the hammers 47 and breaker plates or bars 48. The hammers 47 are formed to function in either direction of rotation so that they do not have to be removed and turned around. The shredded output is then processed in the densifier to classify the total mass of material into acceptable magnetic final product, oversized product which is recycled and trash and unwanted material. The final product and the trash pass through adjacent stations where inspection picking operations are conveniently performed. The inspected final product is conveyed directly to conveyances, such as a railway car, which will take it to the point of use. The trash is conveyed to a collection area for subsequent disposal, and in the modified view of FIG. 10 some trash is conveyed by the duct 96 to furnace 80A where it is incinerated.

The apparatus coordinates the several processing steps in a continuous cycle of operations for economy of space and expense, and in a manner that reduces atmospheric pollution, and controls the hazards from explosion that might otherwise be present if sparks struck by the rotor hammers 47 should occur when the proper conditions of dust and oxygen are present to cause an explosion.

In processing automobile bodies there is approximately 20 percent by weight that is merely dust, dirt and nonmetallic components. When the inert gas generator 80A is connected into the apparatus, a high proportion of these components can be consumed in the gas generator resulting in an inert or low oxygen content atmosphere substantially reducing the danger of explosion. Thus, the present apparatus can materially reduce the quantity of waste components that would have to be disposed of by landfill methods. The present apparatus is, in addition, capable of disposing of industrial rubbish. In both the case of cycling the fines into the furnace 80A, or the case of using industrial rubbish in the furnace 80 or 80A, use of the apparatus reduces the amount of waste material that is left over to be disposed of by landfill operations.

I claim:

1. In waste material reducing and refining apparatus, the combination which includes: a waste material impact reducing and shredding unit having yieldable impact blocks and a series of moving hammers impacting the waste material against said impact blocks, conveyor means feeding waste material to said reducing and shredding unit, material classifier unit connected to said reducing and shredding unit to receive reduced and shredded waste material therefrom, said classifier unit having a plurality if discharge outlets, a first conveyor connected to one of said discharge outlets to move reduced and refined product, a second conveyor connected to another of said discharge outlets and to said feeding conveyor means for recirculating material back to said reducing and shredding unit, and a third conveyor connected to yet another of said discharge outlets to move residual waste material, said third conveyor includes waste material separation means, a receiver for the separated waste material, an inert gaseous atmosphere generating means connected in a closed circuit through said reducing and shredding unit to establish an inert atmosphere in said unit, and means delivering the waste material from said receiver to said generating unit for consumption therein.

2. In the apparatus set forth in claim 1, said classifier unit including means to classify magnetic and nonmagnetic waste material and means to classify waste material by size.

3. In the apparatus set forth in claim 1, a collector unit connected to said reducing and shredding unit remote from said generator unit, and conduit means connecting said generator and collector units to establish a substantially closed inert gas-circulating system through said reducing and shredding unit.

4. In apparatus to produce desired product and discard material from waste material, means to convey waste material in a circuit from waste material, means to convey waste material in a circuit from a waste material inlet through a plurality of processing units; one of said units comprising a reducing and shredding mill having spaced impact blocks, a reversible hammer rotor therebetween, a waste material inlet opening to said rotor and a product outlet opening away from said rotor; another of said units comprising a product classifier having two stages of magnetic separators and an intervening product sizer; conveyor means connecting the product outlet of said mill and said another unit and connecting said product sizer of said another unit to said waste material inlet of said one unit, whereby waste material of a predetermined size is recirculated; and other conveyor means connected to said another unit to receive sized material and move it away from he apparatus.

5. The apparatus set forth in claim 4 wherein said other conveyor means is connected to said another unit adjacent one magnetic separation stage and defines separate paths for moving desired product and discard material.

6. The apparatus set forth in claim 4 wherein inert gas generating and circulating means is connected across said one unit to condition the atmosphere therein as to temperature and oxygen content to substantially suppress explosion inducing conditions.

7. The apparatus set forth in claim 6 wherein said other conveyor means includes means to supply discarded material to said inert gas generator for consumption therein.

8. The apparatus set forth in claim 6 wherein said product sizer includes a deck having product passing openings and means selectively regulating the size of such openings.